United States Patent
Nakamura et al.

(10) Patent No.: US 12,431,487 B2
(45) Date of Patent: Sep. 30, 2025

(54) NEGATIVE ELECTRODE FOR ELECTROCHEMICAL DEVICE, AND ELECTROCHEMICAL DEVICE

(71) Applicant: Panasonic Intellectual Property Management Co., Ltd., Osaka (JP)

(72) Inventors: Yusuke Nakamura, Osaka Fu (JP); Shohei Masuda, Kyoto Fu (JP); Yasuyuki Ito, Osaka Fu (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 535 days.

(21) Appl. No.: 17/913,393

(22) PCT Filed: Mar. 25, 2021

(86) PCT No.: PCT/JP2021/012615
§ 371 (c)(1),
(2) Date: Sep. 21, 2022

(87) PCT Pub. No.: WO2021/193838
PCT Pub. Date: Sep. 30, 2021

(65) Prior Publication Data
US 2023/0268487 A1      Aug. 24, 2023

(30) Foreign Application Priority Data
Mar. 26, 2020    (JP) .................. 2020-056143

(51) Int. Cl.
*H01M 4/36* (2006.01)
*H01M 4/02* (2006.01)
(Continued)

(52) U.S. Cl.
CPC ......... *H01M 4/366* (2013.01); *H01M 4/0402* (2013.01); *H01M 4/485* (2013.01);
(Continued)

(58) Field of Classification Search
CPC .... H01M 4/366; H01M 4/0402; H01M 4/131; H01M 4/137; H01M 4/62
See application file for complete search history.

(56) References Cited

U.S. PATENT DOCUMENTS

| | | |
|---|---|---|
| 2005/0191547 A1 | 9/2005 | Konishiike et al. |
| 2008/0220329 A1 | 9/2008 | Kojima et al. |
| (Continued) | | |

FOREIGN PATENT DOCUMENTS

| | | |
|---|---|---|
| CN | 101140986 A | 3/2008 |
| CN | 105742569 A | 7/2016 |
| (Continued) | | |

OTHER PUBLICATIONS

International Search Report issued in International Patent Application No. PCT/JP2021/012615 mailed Jun. 8, 2021; with English translation.
(Continued)

*Primary Examiner* — Sarah A. Slifka
(74) *Attorney, Agent, or Firm* — Rimon P.C.

(57) ABSTRACT

A negative electrode for an electrochemical device includes a negative electrode core material and a negative electrode material layer supported on the negative electrode core material. The negative electrode material layer contains a carbon material. A surface layer portion of the negative electrode material layer includes a first layer containing lithium carbonate and a second layer containing a solid electrolyte. At least a portion of the second layer covers at least a portion of the surface of the carbon material with the first layer interposed therebetween.

9 Claims, 2 Drawing Sheets

(51) Int. Cl.
H01M 4/04 (2006.01)
H01M 4/485 (2010.01)
H01M 4/587 (2010.01)

(52) U.S. Cl.
CPC ...... *H01M 4/587* (2013.01); *H01M 2004/027* (2013.01); *H01M 2300/008* (2013.01)

(56) References Cited

U.S. PATENT DOCUMENTS

2013/0163147 A1    6/2013   Uehara et al.
2014/0178718 A1    6/2014   Kano

FOREIGN PATENT DOCUMENTS

| | | |
|---|---|---|
| JP | H07-201357 A | 8/1995 |
| JP | H07-302617 A | 11/1995 |
| JP | H11-120992 A | 4/1999 |
| JP | 2005-216601 A | 8/2005 |
| JP | 2014-123641 A | 7/2014 |
| WO | 2007/088604 A1 | 8/2007 |
| WO | 2012/036249 A1 | 3/2012 |

OTHER PUBLICATIONS

Chinese Office Action dated Jul. 12, 2024 issued in the corresponding Chinese Patent Application No. 202180022456.6, with partial English translation.

NEGATIVE ELECTRODE FOR ELECTROCHEMICAL DEVICE, AND ELECTROCHEMICAL DEVICE

CROSS-REFERENCE OF RELATED APPLICATIONS

This application is the U.S. National Phase under 35 U.S.C. § 371 of International Patent Application No. PCT/JP2021/012615, filed on Mar. 25, 2021, which in turn claims the benefit of Japanese Patent Application No. 2020-056143, filed on Mar. 26, 2020, the entire disclosures of which Applications are incorporated by reference herein.

TECHNICAL FIELD

The present invention relates to a negative electrode for an electrochemical device, and also to an electrochemical device.

BACKGROUND ART

Electrochemical devices in which a carbon material storing lithium ions is used in a negative electrode material layer are known (see PTL 1 to 3).

CITATION LIST

Patent Literature

[PTL 1] Japanese Laid-Open Patent Publication No. 2014-123641
[PTL 2] WO 2007/88604 A1
[PTL 3] WO 2012/36249 A1

SUMMARY OF INVENTION

Technical Problem

In an electrochemical device that utilizes lithium ions, a solid electrolyte interface film (i.e., an SEI film) is formed on the negative electrode material layer during charging and discharging. The SEI film plays an important role in charge and discharge reactions, but if the SEI film is excessively thick, the internal resistance of the electrochemical device increases.

Solution to Problem

One aspect of the present invention relates to a negative electrode for an electrochemical device, the negative electrode including: a negative electrode core material; and a negative electrode material layer supported on the negative electrode core material, wherein the negative electrode material layer contains a carbon material, a surface layer portion of the negative electrode material layer includes a first layer containing lithium carbonate and a second layer containing a solid electrolyte, and at least a portion of the second layer covers at least a portion of a surface of the carbon material with the first layer interposed therebetween. The thickness of the first layer is 1 nm or more and 50 nm or less, for example.

Another aspect of the present invention relates to an electrochemical device including: a positive electrode that includes a positive electrode core material and a positive electrode material layer supported on the positive electrode core material; the negative electrode described above; a separator interposed between the positive electrode and the negative electrode; and an electrolyte.

Yet another aspect of the present invention relates to a method for manufacturing a negative electrode for an electrochemical device, including the steps of: preparing a negative electrode that includes a negative electrode core material and a negative electrode material layer supported on the negative electrode core material, the negative electrode material layer containing a carbon material; and forming, on the negative electrode material layer, a first layer that covers at least a portion of a surface of the carbon material, contains lithium carbonate, and has a thickness of 1 nm or more and 50 nm or less.

Advantageous Effects of Invention

According to the present invention, it is possible to effectively suppress an increase in internal resistance (particularly the resistance of the negative electrode) in an electrochemical device.

While novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
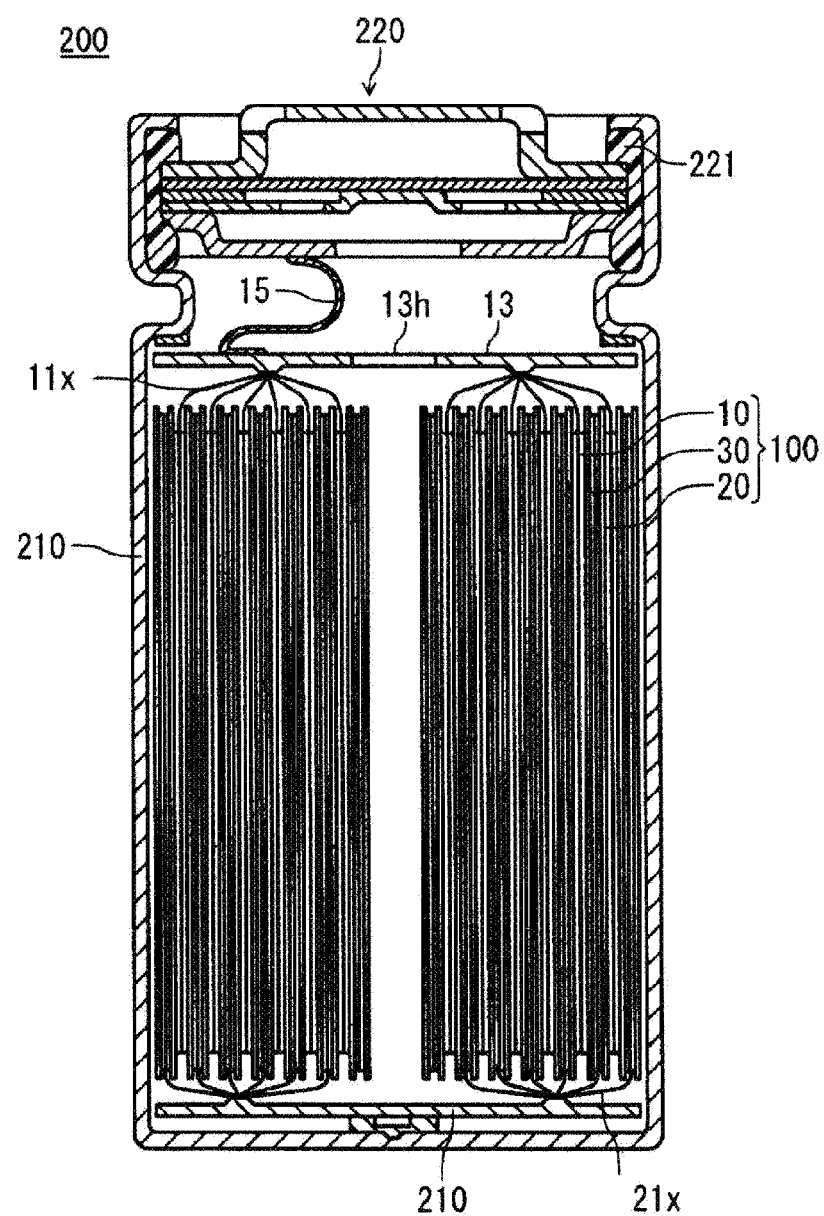
FIG. 1 A vertical cross-sectional view of an electrochemical device according to an embodiment of the present invention.

A negative electrode for an electrochemical device according to one embodiment of the present invention includes a negative electrode core material and a negative electrode material layer supported on the negative electrode core material, and the negative electrode material layer contains a carbon material. A surface layer portion of the negative electrode material layer is constituted by a film formed on a surface of the carbon material. The film includes a first layer and a second layer. At least a portion of the second layer covers at least a portion of the surface of the carbon material with the first layer interposed therebetween. In other words, at least a portion of the first layer is covered by the second layer. Such a first layer is interposed between the surface of the carbon material and the second layer, and serves as a base layer for the second layer.

Since lithium carbonate is contained in at least the first layer, the surface layer portion of the negative electrode material layer has a lithium carbonate-containing region. The lithium carbonate-containing region is, for example, a surface layer portion or a film region where the substantial presence of lithium carbonate is observed by analysis by X-ray photoelectron spectroscopy (XPS). Note that the analysis is not limited to being performed by XPS.

The second layer, on the other hand, is an SEI film and contains a solid electrolyte. An SEI film is formed by reaction between an electrolyte and the negative electrode in an electrochemical device, for example. Since the electrolyte can pass through the first layer as well as the second layer, the entirety of the surface layer portion including the first layer and the second layer may be referred to as the SEI film, but for the sake of convenience, in the present specification, the second layer is called the SEI film and distinguished from the first layer.

The lithium carbonate-containing region is formed as the first layer constituting the surface layer portion of the negative electrode material layer before assembly of the electrochemical device. If the lithium carbonate-containing region is formed in advance so as to cover at least a portion of the surface of the carbon material, in an electrochemical device assembled using such a negative electrode, it is thought that a homogenous second layer (SEI film) having a suitable thickness is formed on the surface of the carbon material due to subsequent charging and discharging. Accordingly, an increase in the internal resistance of the electrochemical device is reduced. Here, the thickness of the first layer (lithium carbonate-containing region) need only be greater than or equal to 1 nm, for example, but is desirably greater than or equal to 5 nm if longer-term effects are to be expected, and may be greater than or equal to 10 nm if more reliable effects are to be expected. However, when the thickness of the lithium carbonate-containing region exceeds 50 nm, the lithium carbonate-containing region itself becomes a resistance component, thus increasing the internal resistance of the electrochemical device. Accordingly, the thickness of the lithium carbonate-containing region may be less than or equal to 50 nm, or less than or equal to 30 nm.

The thickness of the second layer need only be greater than or equal to 1 nm, and may be greater than or equal to 3 nm, and it is sufficient if the thickness is greater than or equal to 5 nm, for example. When the thickness of the second layer exceeds 20 nm, the second layer itself becomes a resistance component, and thus the internal resistance of the electrochemical device tends to increase at the beginning of the charge/discharge cycle. Accordingly, the thickness of the second layer may be less than or equal to 20 nm, or less than or equal to 10 nm.

The ratio A/B of the thickness A of the first layer to the thickness B of the second layer is preferably less than or equal to 1, from the viewpoint of reducing the initial internal resistance. At this time, the thickness of the second layer is preferably less than or equal to 20 nm, and may be less than or equal to 10 nm. However, from the viewpoint of forming the second layer with good conditions, the ratio A/B is desirably greater than or equal to 0.1, and the A/B ratio may be greater than or equal to 0.2, for example.

The thicknesses of the first layer and the second layer are measured by analyzing the surface layer portion of the negative electrode material layer at a plurality of locations (at least five locations) in the negative electrode material layer. Then, the average of the thicknesses of the first layer or the second layer obtained at the various locations may be taken as the thickness of the first layer or the second layer. Note that the negative electrode material layer used as the measurement sample may be peeled off from the negative electrode core material. In this case, it is sufficient to analyze the film formed on the surface of the carbon material that had formed a portion in the vicinity of the surface layer portion of the negative electrode material layer. Specifically, the carbon material covered with the film may be sampled from the region of the negative electrode material layer disposed on the side opposite to the surface bonded to the negative electrode core material and used for analysis.

XPS analysis of the surface layer portion of the negative electrode material layer is performed by, for example, irradiating the film formed on the surface of the carbon material or the surface layer portion with an argon beam in the chamber of an X-ray photoelectron spectrometer, and observing and recording changes in the spectrum attributed to C1s or O1s electrons with respect to the irradiation time. At this time, from the viewpoint of avoiding analysis error, the spectrum of the outermost surface of the surface layer portion may be ignored. The thickness of the region where a peak attributed to lithium carbonate is stably observed corresponds to the thickness of the lithium carbonate-containing region (here, the thickness of the first layer).

When the negative electrode is taken out from an electrochemical device that has undergone predetermined aging or at least one charge/discharge cycle after completion, the surface layer portion of the negative electrode material layer has an SEI film (i.e., a second layer) that contains a solid electrolyte formed in the electrochemical device. The thickness of the region where a peak attributed to bonds of the compound contained in the SEI film is stably observed corresponds to the thickness of the SEI film (i.e., the thickness of the second layer).

A compound containing an element that can serve as a label for the second layer is selected as the compound contained in the SEI film. The element that can serve as a label for the second layer is desirably selected as an element that is contained in the electrolyte but not substantially contained in the first layer (e.g., F). For example, LiF can be selected as the compound containing an element that can serve as a label for the second layer.

If the second layer contains LiF, a substantial F1s peak attributed to LiF bonds is observed when the second layer is measured by X-ray photoelectron spectroscopy. In this case, the thickness of the region where peaks attributed to LiF bonds are stably observed corresponds to the thickness of the second layer.

On the other hand, the first layer usually does not contain LiF, and even if the first layer is measured by X-ray photoelectron spectroscopy, no substantial F1s peaks attributed to LiF bonds are observed. Accordingly, the thickness of the region where peaks attributed to LiF bonds are not stably observed may be used as the thickness of the first layer.

An O1s peak attributed to lithium carbonate can be observed in the SEI film as well. However, the SEI film produced in the electrochemical device has a different composition than the pre-formed lithium carbonate-containing region, and thus the two can be distinguished from each other. For example, in the XPS analysis of the SEI film, F1s peaks attributed to LiF bonds are observed, but substantial F1s peaks attributed to LiF bonds are not observed in the lithium carbonate-containing region. Also, the amount of lithium carbonate contained in the SEI film is very small. Note that peaks derived from compounds such as $ROCO_2Li$ and ROLi can be detected as Li1s peaks.

When the lithium carbonate-containing region is analyzed by XPS, a second peak for O1s attributed to Li—O bonds may be observed in addition to the first peak for O1s attributed to C=O bonds. It is thought that regions of the film present near the surface of the carbon material contain a slight amount of LiOH or $Li_2O$.

Specifically, when the first layer constituting the surface layer portion of the negative electrode material layer is analyzed in the depth direction, in order of increasing distance from the outermost surface of the surface layer portion, a first region, in which the first peak (O1s attributed to C=O bonds) and the second peak (O1s attributed to Li—O bonds) are observed and furthermore the first peak intensity is greater than the second peak intensity, and a second region, in which the first peak and the second peak are observed and furthermore the second peak intensity is greater than the first peak intensity, may be observed. There may also be a third region in which the first peak is observed and the second peak is not observed, at a distance closer to the outermost surface of the surface layer portion than the first region is. The third region is likely to be observed in the case where the thickness of the lithium carbonate-containing region is large.

Note that the intensity of the peak can be determined by the height of the peak from the baseline.

At the center of the lithium carbonate-containing region in the thickness direction, the C1s peak attributed to C—C bonds is usually not substantially observed, or if observed, is less than or equal to half of the intensity of the peak attributed to C=O bonds.

Next, an electrochemical device according to an embodiment of the present invention includes: a positive electrode having a positive electrode core material and a positive electrode material layer supported on the positive electrode core material; the above-described negative electrode; a separator interposed between the positive electrode and the negative electrode; and an electrolyte. The negative electrode and the positive electrode, along with the separator interposed therebetween, constitute an electrode body. The electrode body is configured as a columnar wound body, for example, by winding a strip-shaped positive electrode and a strip-shaped negative electrode with a separator interposed therebetween. Also, the electrode body may be configured as a laminate by laminating a plate-like positive electrode and a plate-like negative electrode with a separator interposed therebetween.

The positive electrode material layer contains a conductive polymer as the positive electrode material, for example. For example, polyaniline or a derivative thereof can be used as the conductive polymer. Among electrochemical devices that employ lithium ions, electrochemical devices in which the positive electrode material layer contains a conductive polymer and the negative electrode material layer contains a carbon material are anticipated for use in various fields such as in-vehicle applications. In such an electrochemical device, during charging, lithium ions in the electrolyte are absorbed into the negative electrode, and anions are adsorbed (doped) into the positive electrode. During discharge, lithium ions are released from the negative electrode into the electrolyte, and anions are desorbed (de-doped) from the positive electrode into the electrolyte. A conductive polymer is charged and discharged by anion doping and de-doping, and thus has low reaction resistance and can easily achieve high output.

However, a conductive polymer is an organic substance, and thus has low heat resistance, and can be dissolved in a solvent in which the electrolyte has strong polarity. For example, the solvent in the electrolyte may decompose in a side reaction to produce alcohol. Conductive polymers such as polyaniline are influenced by alcohol. Specifically, a non-aqueous electrolyte decomposes on the negative electrode, and the decomposed product reacts with water in the non-aqueous electrolyte to generate a trace amount of alcohol. Polyaniline can possibly dissolve due to the alcohol. On the other hand, if the surface layer portion of the negative electrode material layer includes the first layer and the second layer, the structural stability of the surface layer portion is improved, and thus side reactions are suppressed and the production of alcohol is suppressed. It is inferred that this is because if the SEI film (second layer) is formed on the lithium carbonate-containing region (first layer) serving as the base layer, the SEI film is formed densely.

One example of the anions is fluorine-containing anions. An electrolyte salt having such anions has a high degree of dissociation and provides a low-viscosity electrolyte. Also, by including fluorine-containing anions in the electrolyte, the withstand voltage characteristics of the electrochemical device can be improved.

Next, a method for manufacturing a negative electrode for an electrochemical device according to an embodiment of the present invention includes: a first step of preparing a negative electrode that includes a negative electrode core material and a negative electrode material layer supported on the negative electrode core material, the negative electrode material layer containing a carbon material; and a second step of forming, on the negative electrode material layer, a first layer that covers at least a portion of a surface of the carbon material, contains lithium carbonate, and has a thickness i of 1 nm or more and 50 nm or less.

The second step of forming the first layer that covers at least a portion of the surface of the carbon material on the negative electrode material layer can be performed by a vapor phase method, a coating method, a transfer method, or the like.

Examples of a vapor phase method include chemical vapor deposition, physical vapor deposition, and sputtering. For example, lithium carbonate may be deposited on the surface of the negative electrode material layer using a vacuum vapor deposition apparatus. For example, the pressure in the apparatus chamber during vapor deposition may be 10-2 to 10-5 Pa, the temperature of the lithium carbonate evaporation source may be 400 to 600° C., and the temperature of the negative electrode material layer may be −20 to 80° C.

As an example of a coating method, the first layer can be formed by using a micro gravure coater or the like to apply a solution or dispersion containing lithium carbonate on the surface of the negative electrode and then performing drying. The content of lithium carbonate in the solution or dispersion may be 0.3 to 2 mass %, for example, and when using a solution, the concentration need only be lower than the degree of solubility (e.g., about 0.9 to 1.3 mass % for an aqueous solution at room temperature).

Furthermore, the negative electrode can be obtained by performing a third step of forming a second layer that contains a solid electrolyte and covers at least a portion of the first layer. The surface layer portion of the obtained negative electrode material layer includes the first layer and the second layer. The second layer is formed such that at least a portion thereof covers at least a portion (preferably the entirety) of the surface of the carbon material with the first layer interposed therebetween (i.e., with the first layer as a base layer).

Due to the third step being performed while the negative electrode material layer and the electrolyte are in contact with each other, it may also serve as at least a portion of a step of pre-doping the negative electrode material layer with lithium ions. As one example, metal lithium is used as the pre-doping lithium ion source.

For example, the third step includes an aging step of, after assembling the electrochemical device containing a lithium ion source, applying a predetermined charging voltage (e.g., 3.4 to 4.0 V) between the terminals of the positive electrode and the negative electrode for a predetermined time (e.g., 1 to 75 hours) to complete the pre-doping of the negative electrode with lithium ions. Alternatively, the third step may include a step of performing charging and discharging at least once after assembling the electrochemical device. Accordingly, an SEI film (i.e., the second layer) containing the solid electrolyte is formed on the negative electrode material layer.

Although the electrochemical device according to the present invention encompasses electrochemical devices such as a lithium ion secondary battery, a lithium ion capacitor, and an electric double layer capacitor, the present invention is particularly suited to a configuration as an intermediate electrochemical device between a lithium ion capacitor and a lithium ion secondary battery in which a conductive polymer is used as the positive electrode material.

FIG. 1 schematically illustrates the configuration of an electrochemical device 200 according to an embodiment of the present invention. The electrochemical device 200 includes an electrode body 100, a non-aqueous electrolyte (not shown), a bottomed metal cell case 210 containing the electrode body 100 and the non-aqueous electrolyte, and a sealing plate 220 that seals the opening of the cell case 210. A gasket 221 is disposed around the peripheral edge of the sealing plate 220, and the open end of the cell case 210 is crimped to the gasket 221, thus sealing the cell case 210. A positive current collector plate 13 having a through hole 13h in the center is welded to positive electrode core material exposed portions 11x. One end of a tab lead 15 is connected to the positive current collector plate 13, and the other end is connected to the inward surface of the sealing plate 220. Accordingly, the sealing plate 220 functions as an external positive electrode terminal. On the other hand, a negative current collector plate 23 is welded to negative electrode core material exposed portions 21x. The negative current collector plate 23 is directly welded to a welding member provided on the inward bottom surface of the cell case 210. Accordingly, the cell case 210 functions as an external negative electrode terminal.

Hereinafter, constituent elements of the electrochemical device according to an embodiment of the present invention will be described in more detail by way of example of an electrochemical device using a conductive polymer as a positive electrode material and using a carbon material as a negative electrode material.

Positive Electrode Core Material

A sheet of metal material is used as the positive electrode core material. The sheet of metal material may be a metal foil, a metal porous body, etched metal, or the like. Examples of the metal material include aluminum, an aluminum alloy, nickel, and titanium. The thickness of the positive electrode core material is 10 to 100 μm, for example. The positive electrode core material may have a carbon layer. The carbon layer is interposed between the positive electrode core material and the positive electrode material layer, and has a function of improving the performance of current collection from the positive electrode material layer to the positive electrode core material, for example.

Carbon Layer

The carbon layer is formed by, for example, vapor-depositing a conductive carbon material on the surface of the positive electrode core material, or applying a film of a carbon paste containing a conductive carbon material to the surface of the positive electrode core material and then drying the applied film. The carbon paste includes a conductive carbon material, a polymer material, and water or an organic solvent, for example. The thickness of the carbon layer may be 1 to 20 μm, for example. Examples of the conductive carbon material include graphite, hard carbon, soft carbon, and carbon black. In particular, carbon black can form a thin carbon layer that has excellent conductivity. Examples of the polymer material include a fluorocarbon resin, an acrylic resin, polyvinyl chloride, and styrene-butadiene rubber (SBR).

Positive Electrode Material Layer

The positive electrode material layer contains a conductive polymer. The positive electrode material layer is formed by, for example, immersing a positive electrode core material provided with a carbon layer in a reaction liquid containing a raw material monomer of a conductive polymer, and subjecting the raw material monomer to electrolytic polymerization in the presence of the positive electrode core material. At this time, by performing electrolytic polymerization using the positive electrode core material as an anode, a positive electrode material layer containing a conductive polymer can be formed so as to cover the carbon layer. The thickness of the positive electrode material layer can be controlled with the electrolytic current density, the polymerization time, or the like. The thickness of the positive electrode material layer is 10 to 300 μm per side, for example.

The conductive polymer is preferably a π-conjugated polymer. The π-conjugated polymer may be polypyrrole, polythiophene, polyfuran, polyaniline, polythiophene vinylene, polypyridine, or a derivative thereof. Such substances may be used singly, or combinations of two or more may be used. The weight-average molecular weight of the conductive polymer is 1,000 to 100,000, for example. A derivative of a π-conjugated polymer refers to a polymer having π-conjugated polymer, such as polypyrrole, polythiophene, polyfuran, polyaniline, polythiophene vinylene, and polypyridine, as its basic skeleton. One example of a derivative of polythiophene is poly(3,4-ethylenedioxythiophene) (PEDOT).

The positive electrode material layer may be formed by a method other than electrolytic polymerization. For example, chemical polymerization of a raw material monomer may be employed to form the positive electrode material layer containing a conductive polymer. Also, a pre-synthesized conductive polymer or a dispersion thereof may be used to form the positive electrode material layer.

The raw material monomer used for electrolytic polymerization or chemical polymerization may be a polymerizable compound capable of producing a conductive polymer through polymerization. The raw material monomer may contain an oligomer. For example, the raw material monomer may be aniline, pyrrole, thiophene, furan, thiophene vinylene, pyridine, or a derivative thereof. Such substances may be used singly, or combinations of two or more may be used. Among such examples, aniline can be easily grown through electrolytic polymerization on the carbon layer.

The electrolytic polymerization or chemical polymerization can be allowed to proceed using a reaction liquid containing an anion (dopant). By doping the π-electron conjugated polymer with a dopant, excellent conductivity can be developed. For example, in chemical polymerization, the doping can be performed by immersing a positive electrode core material in a reaction liquid that contains a dopant, an oxidizing agent, and a raw material monomer, and then taking the resultant out from the reaction liquid and performing drying. As another example, in electrolytic polymerization, doping can be performed by immersing a positive electrode core material together with a counter electrode in a reaction liquid that contains a dopant and a raw material monomer, and applying a current therebetween, with the positive electrode core material used as the anode.

Examples of the dopant include a sulfate ion, a nitrate ion, a phosphate ion, a borate ion, a benzene sulfonate ion, a naphthalene sulfonate ion, a toluene sulfonate ion, a methane sulfonate ion ($CF_3SO_3^-$), a perchlorate ion ($ClO_4^-$), a tetrafluoroborate ion ($BF_4^-$), a hexafluorophosphate ion ($PF_6^-$), a fluorosulfate ion ($FSO_3^-$), a bis(fluorosulfonyl) imide ion ($N(FSO_2)_2^-$), and a bis(trifluoromethanesulfonyl) imide ion ($N(CF_3SO_2)_2^-$). Such substances may be used singly, or combinations of two or more may be used.

The dopant may be a polymer ion. Examples of the polymer ion include ions of polyvinyl sulfonic acid, polystyrene sulfonic acid, polyallyl sulfonic acid, polyacrylic sulfonic acid, polymethacrylic sulfonic acid, poly(2-acrylamido-2-methylpropanesulfonic acid), polyisoprene sulfonic acid, and polyacrylic acid. Such substances may be a homopolymer or a copolymer of two or more kinds of monomers. Such substances may be used singly, or combinations of two or more may be used.

Positive Current Collector Plate

The positive current collector plate is an approximately disc-shaped metal plate. It is preferable that the central portion of the positive current collector plate is provided with a through hole serving as a flow path for a non-aqueous electrolyte. The positive current collector plate is made of a material such as aluminum, an aluminum alloy, titanium, or stainless steel. The material of the positive current collector plate may be the same as that of the positive electrode core material.

Negative Electrode Core Material

A sheet of metal material is used as the negative electrode core material as well. The sheet of metal material may be metal foil, a metal porous body, etched metal, or the like. Examples of the metal material include copper, a copper alloy, nickel, and stainless steel. The thickness of the negative electrode core material is smaller than that of the positive electrode core material, and is 10 to 100 μm, for example.

Negative Electrode Material Layer

The negative electrode material layer contains, as a negative electrode active material, a carbon material that electrochemically absorbs and releases lithium ions. Preferred examples of the carbon material include graphite, non-graphitizable carbon (hard carbon), and graphitizable carbon (soft carbon), among which graphite and hard carbon are particularly preferred. A carbon material and another material may be used together.

The negative electrode material layer may contain a conductive agent, a binder, or the like in addition to the negative electrode active material. Examples of the conductive agent include carbon black and carbon fiber. Examples of the binder include a fluorocarbon resin, an acrylic resin, a rubber material, and a cellulose derivative. The negative electrode material layer is formed by, for example, mixing a negative electrode active material, a conductive agent and a binder, together with a dispersion medium, to prepare a negative electrode material mixture paste, and then applying the negative electrode material mixture paste onto a negative electrode current collector and performing drying. The thickness of the negative electrode material layer is 10 to 300 μm per side, for example.

The negative electrode material layer is pre-doped with lithium ions in advance. This lowers the potential of the negative electrode, and therefore the potential difference between the positive and negative electrodes (i.e., the voltage) increases, and the energy density of the electrochemical device is improved. The pre-doping of lithium ions into the negative electrode material layer proceeds due to, for example, impregnating the metallic lithium together with the negative electrode with the non-aqueous electrolyte. Lithium ions leach out from the metal lithium into the non-aqueous electrolyte and are absorbed into the negative electrode material layer. The amount of pre-doped lithium is, for example, about 50% to 95% of the maximum amount that can be absorbed into the negative electrode material layer.

Negative Current Collector Plate

The negative current collector plate is an approximately disc-shaped metal plate. The negative current collector plate is made of a material such as copper, a copper alloy, nickel, or stainless steel. The material of the negative current collector plate may be the same as that of the negative electrode core material.

Separator

The separator can be a non-woven fabric made of cellulose fibers, a non-woven fabric made of glass fibers, a microporous film or a woven or non-woven fabric made of polyolefin, or the like. The thickness of the separator is 10 to 300 μm, and preferably 10 to 40 μm, for example.

Electrolyte

The electrolyte has lithium ion conductivity and contains a lithium salt and a solvent in which the lithium salt is dissolved. The anions of the lithium salt are reversibly and repeatedly doped into and de-doped from the positive electrode. Lithium ions derived from the lithium salt are reversibly absorbed into and released from the negative electrode.

Examples of the lithium salt include $LiClO_4$, $LiBF_4$, $LiPF_6$, $LiAlCl_4$, $LiSbF_6$, $LiSCN$, $LiCF_3SO_3$, $LiFSO_3$, $LiCF_3CO_2$, $LiAsF_6$, $LiB_{10}Cl_{10}$, $LiCl$, $LiBr$, $LiI$, $LiBCl_4$, $LiN(FSO_2)_2$, and $LiN(CF_3SO_2)_2$. Such substances may be used singly, or combinations of two or more may be used. In particular, a salt having a fluorine-containing anion is preferred. The concentration of the lithium salt in the non-aqueous electrolyte in a charged state (State Of Charge (SOC): 90 to 100%) is 0.2 to 5 mol/L, for example.

Examples of the solvent include: cyclic carbonates, such as ethylene carbonate, propylene carbonate, and butylene carbonate; chain carbonates, such as dimethyl carbonate, diethyl carbonate, and ethyl methyl carbonate; aliphatic carboxylic acid esters, such as methyl formate, methyl acetate, methyl propionate, and ethyl propionate; lactones, such as γ-butyrolactone, and γ-valerolactone; chain ethers, such as 1,2-dimethoxyethane (DME), 1,2-diethoxyethane (DEE), and ethoxymethoxyethane (EME); cyclic ethers, such as tetrahydrofuran and 2-methyltetrahydrofuran; and others, such as dimethyl sulfoxide, 1,3-dioxolane, formamide, acetamide, dimethylformamide, dioxolane, acetonitrile, propionitrile, nitromethane, ethyl monoglyme, trimethoxymethane, sulfolane, methylsulfolane, and 1,3-propane sultone. Such substances may be used singly, or combinations of two or more may be used.

Various additives may be added to the electrolyte if necessary. For example, an unsaturated carbonate such as vinylene carbonate, vinyl ethylene carbonate, or divinyl ethylene carbonate may be added as an additive for forming a film with lithium ion conductivity on a surface of the negative electrode.

EXAMPLES

The present invention will be more specifically described below with reference to examples, but the present invention is not limited to these examples.

Example 1

(1) Production of Positive Electrode

A carbon layer (thickness: 2 μm) containing carbon black was formed on both sides of a piece of aluminum foil (positive electrode core material) having a thickness of 25 μm. Also, an aniline aqueous solution containing aniline and sulfuric acid was prepared. The positive electrode core material and a counter electrode were immersed in the aniline aqueous solution, and electrolytic polymerization was performed for 20 minutes with a current density of 10 mA/cm$^2$, thus growing a film of a conductive polymer (polyaniline) doped with sulfate ions ($SO_4^{2-}$) on the carbon layer, serving as the positive electrode material layer. At this time, a positive electrode core material exposed portion having a width of 10 mm was formed at a lengthwise end portion of the positive electrode core material. Next, the conductive polymer doped with sulfate ions was reduced to de-dope the doped sulfate ions, and then the positive electrode material layer was thoroughly washed and dried. The thickness of the positive electrode material layer was 50 μm per side.

(2) Production of Negative Electrode

A piece of copper foil (negative electrode core material) having a thickness of 10 μm was prepared. Separately, a negative electrode material mixture paste was prepared by kneading a mixed powder of 97 parts by mass of a hard carbon, 1 part by mass of carboxy cellulose, and 2 parts by mass of styrene-butadiene rubber, with water at a mass ratio of 40:60. The negative electrode material mixture paste was applied onto both sides of the negative electrode core material and dried to form a negative electrode material layer having a thickness of 50 μm. A negative electrode core material exposed portion having a width of 10 mm was formed at a lengthwise end portion of the negative electrode core material.

After that, a lithium carbonate source was introduced into the chamber of the device, and a first layer containing lithium carbonate was formed on the negative electrode material layer by vapor phase method. The pressure inside the chamber was 10-2 Pa. The temperature of the negative electrode was −10° C. The temperature of the lithium carbonate vapor source was 500° C. The thickness of the first layer was changed as shown in Table 1, and negative electrodes A1 to A9 according to corresponding examples and a negative electrode B1 according to a comparative example were obtained. Note that in the negative electrode B1 of Comparative Example 1, the first layer containing lithium carbonate was not formed on the negative electrode material layer.

Evaluation 1

The surface layer portion of the negative electrode material layer was subjected to XPS analysis, and the thickness of the lithium carbonate-containing region (first layer) was measured. An X-ray photoelectron spectrometer (product name: Model 5600, manufactured by ULVAC-Phi, Inc.) was used for the XPS analysis. The measurement conditions are shown below.

X-ray source: Al-mono (1486.6 eV) 14 kV/200 W
Measurement diameter: 800 μm φ
Photoelectron take-off angle: 45° Etching conditions: accelerating voltage of 3 kV, etching rate of around 3.1 nm/min ($SiO_2$ conversion), raster area of 3.1 mm×3.4 mm FIG. 2 is a diagram showing a C1s spectrum obtained by XPS analysis of the first layer of the negative electrode material layer of the negative electrode A4 of Example 4.

Figure 2:
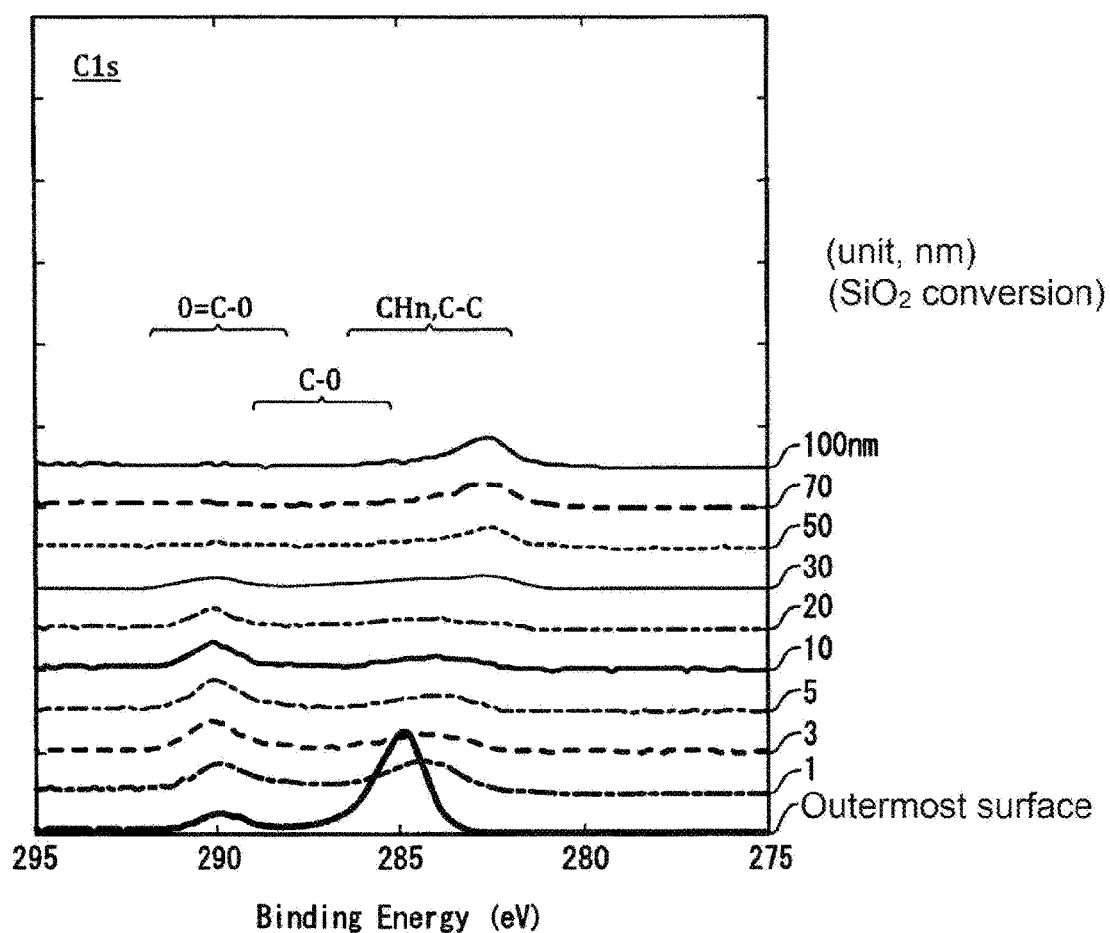
FIG. 2 A C1s spectrum in an XPS analysis of a lithium carbonate-containing region (first layer) that has a thickness of 30 nm.

According to FIG. 2, peaks attributed to C—C bonds or the like, which are presumed to be impure carbon, can be seen on the outermost surface of the first layer, but they sharply decrease near a depth of 1 to 3 nm in the first layer, and nearly disappear at a depth of 10 to 20 nm. Peaks attributed to C—C bonds or the like seen in the deep part are presumed to be peaks derived from hard carbon serving as the active material. On the other hand, peaks attributed to C=O bonds are regularly observed from the outermost surface of the first layer to a depth of 30 nm.

(3) Production of Electrode Body

The positive electrode and the negative electrode were wound in a columnar shape, with a separator (thickness: 35 μm) of a cellulose nonwoven fabric interposed therebetween, to form an electrode body. The positive electrode core material exposed portion was arranged so as to protrude from one end surface of the wound body, and the negative electrode core material exposed portion was arranged so as to protrude from the other end surface of the electrode body. A positive current collector plate and a negative current collector plate, each having a disc-like shape, were respectively welded to the positive electrode core material exposed portion and the negative electrode core material exposed portion.

(4) Preparation of Non-Aqueous Electrolyte

A solvent was prepared by adding 0.2 mass % of vinylene carbonate to a mixture of propylene carbonate and dimethyl carbonate with a volume ratio of 1:1. $LiPF_6$ was dissolved as a lithium salt in the solvent at a predetermined concentration, to prepare a non-aqueous electrolyte having hexafluorophosphate ions ($PF_6^-$) as anions.

(5) Assembly of Electrochemical Device

The electrode body was placed in a bottomed cell case having an opening, a tab lead connected to the positive current collector plate was connected to the inward surface of a sealing plate, and a negative current collector plate was welded to the inner bottom surface of the cell case. A non-aqueous electrolyte was injected into the cell case along with a metal lithium foil serving as a source of lithium ions for pre-doping, and then the opening of the cell case was sealed with the sealing plate, thus obtaining an electrochemical device as illustrated in FIG. 1. The amount of lithium to be pre-doped was set such that the negative electrode potential in the non-aqueous electrolyte after completion of pre-doping was 0.2 V or less with respect to metal lithium. Cells A1 to A9 of Examples 1 to 9 are electrochemical devices that include negative electrodes A1 to A9 of the examples. Cell B1 of Comparative Example 1 is an electrochemical device that includes the negative electrode B1 of Comparative Example 1.

Thereafter, aging was performed at 60° C. for a predetermined time (10 to 80 hours) while applying a charge voltage of 3.8 V between the positive and negative electrode terminals, to complete the pre-doping of lithium ions into the negative electrode. The thickness of the second layer changed depending on the aging temperature and time. Here, the thickness of the second layer was controlled to a range of 5 nm to 25 nm.

Evaluation 2

Upon similarly performing XPS analysis on the surface layer portions of the negative electrode material layers of the negative electrodes taken out from the electrochemical devices, it was confirmed that SEI films (second layers) having the thicknesses shown in Table 1 were formed.

Evaluation 3

Initial Characteristics

Immediately after aging, the electrochemical devices were charged at a voltage of 3.8 V, and then the capacitances were determined. Also, the electrochemical devices were discharged from the voltage of 3.8 V for a predetermined time, and the internal resistance (initial DCR) was obtained from the amount of voltage drop at that time.

Characteristics after Charge/Discharge Cycles

After 100,000 cycles of charging and discharging in the range of 3.8 V to 2.2 V, the capacitance and internal resistance (DCR) were obtained in a similar manner.

Negative Electrode Reliability

The thickness of the negative electrode material layer was measured before assembling the electrochemical device and after the charge-discharge cycles. It can be said that the smaller the change in the thickness of the negative electrode material layer is, the better the reliability is.

Table 1 shows the results.

results in Table 1 show that a sufficiently remarkable effect can be obtained if the thickness of the first layer is 1 μm to 5 μm.

INDUSTRIAL APPLICABILITY

The electrochemical device according to the present invention is favorable for in-vehicle use, for example.

REFERENCE SIGNS LIST

100: electrode body
10: positive electrode
11x: positive electrode core material exposed portion
13: positive current collector plate
15: tab lead
20: negative electrode
21x: negative electrode core material exposed portion
23: negative current collector plate
30: separator
200: electrochemical device
210: cell case
220: sealing plate
221: gasket

TABLE 1

| | Surface layer portion | | Initial characteristics | | After 100,000 cycle experiment | | | | Negative electrode initial | Negative electrode thickness after |
|---|---|---|---|---|---|---|---|---|---|---|
| Cell | First layer thickness A (nm) | Second layer thickness B (nm) | Capacitance (F) | DCR (mΩ) | Capacitance (F) | DCR (mΩ) | Capacitance retention rate | DCR increase rate | thickness (μm) | cycles (μm) |
| B1 | 0 | 25 | 1005 | 6.6 | 530 | 15.3 | 53% | 232% | 50 | 70 |
| A1 | 0.5 | 5 | 1002 | 3.6 | 751 | 6.3 | 75% | 175% | 50 | 60 |
| A2 | 1 | 5 | 998 | 3.7 | 891 | 4.9 | 89% | 132% | 50 | 51 |
| A3 | 5 | 5 | 1001 | 3.8 | 889 | 4.9 | 89% | 129% | 50 | 52 |
| A4 | 30 | 5 | 995 | 3.9 | 893 | 4.8 | 90% | 123% | 50 | 52 |
| A5 | 50 | 5 | 998 | 4.1 | 901 | 5 | 90% | 122% | 50 | 53 |
| A6 | 60 | 5 | 999 | 6.3 | 900 | 7.8 | 90% | 124% | 50 | 53 |
| A7 | 5 | 10 | 998 | 4.2 | 903 | 5.4 | 90% | 129% | 50 | 51 |
| A8 | 5 | 20 | 994 | 4.3 | 900 | 4.6 | 91% | 107% | 50 | 52 |
| A9 | 5 | 25 | 1005 | 7.3 | 903 | 8.0 | 90% | 110% | 50 | 52 |

From a comparison between Examples 1 to 9 and Comparative Example 1, it can be understood that due to forming the first layer, it is easier to control the thickness of the second layer, the initial DCR can be reduced, and it is possible to obtain an electrochemical device whose negative electrode has excellent reliability. Also, it can be understood that as long as the thickness of the first layer is not extremely large, the smaller the thickness of the second layer is, the lower the initial DCR can be.

A small change in the thickness of the negative electrode means that the initially formed SEI film is stable, and damage and regeneration of the SEI film are less likely to occur. Therefore, in each example, the capacitance retention rate is high and the DCR increase rate is small.

It can be understood that even when the first layer has a thickness of only 0.5 nm, compared with Comparative Example 1, the capacitance retention rate is significantly higher and the DCR increase rate is significantly lower. The

The invention claimed is:

1. A negative electrode for an electrochemical device, the negative electrode comprising:
   a negative electrode core material; and
   a negative electrode material layer supported on the negative electrode core material,
   wherein the negative electrode material layer contains a carbon material,
   a surface layer portion of the negative electrode material layer includes a first layer containing lithium carbonate and a second layer containing a solid electrolyte,
   a ratio A/B of a thickness A of the first layer to a thickness B of the second layer is more than 0.1 and less than or equal to 1, and
   at least a portion of the second layer covers at least a portion of a surface of the carbon material with the first layer interposed therebetween.

2. The negative electrode for an electrochemical device according to claim 1,
wherein the second layer contains lithium carbonate, and a content of the lithium carbonate contained in the second layer is smaller than a content of the lithium carbonate contained in the first layer.

3. The negative electrode for an electrochemical device according to claim 1,
wherein a thickness of the first layer is 1 nm or more and 50 nm or less.

4. The negative electrode for an electrochemical device according to claim 1,
wherein a thickness of the second layer is 5 nm or more and 15 nm or less.

5. The negative electrode for an electrochemical device according to claim 1,
wherein when the first layer is measured by X-ray photoelectron spectroscopy, no substantial F1s peak attributed to an LiF bond is observed, and
when the second layer is measured by X-ray photoelectron spectroscopy, a substantial F1s peak attributed to an LiF bond is observed.

6. An electrochemical device comprising:
a positive electrode that includes a positive electrode core material and a positive electrode material layer supported on the positive electrode core material;
the negative electrode according to claim 1;
a separator interposed between the positive electrode and the negative electrode; and
an electrolyte.

7. The electrochemical device according to claim 6,
wherein the positive electrode material layer contains a conductive polymer.

8. The electrochemical device according to claim 6,
wherein the electrolyte contains lithium ions and fluorine-containing anions.

9. A method for manufacturing a negative electrode for an electrochemical device, comprising the steps of:
preparing a negative electrode that includes a negative electrode core material and a negative electrode material layer supported on the negative electrode core material, the negative electrode material layer containing a carbon material; and
forming a first layer that covers at least a portion of a surface of the carbon material, contains lithium carbonate, and has a thickness of 1 nm or more and 50 nm or less; and
forming a second layer that contains a solid electrolyte and covers at least a portion of the first layer,
wherein a ratio A/B of a thickness A of the first layer to a thickness B of the second layer is more than 0.1 and less than or equal to 1.

* * * * *